United States Patent
Lee et al.

(10) Patent No.: US 8,704,631 B2
(45) Date of Patent: Apr. 22, 2014

(54) APPARATUS AND METHOD FOR CONTROLLING KEY LOCK IN PORTABLE TERMINAL

(75) Inventors: Seung-Woo Lee, Yongin-si (KR); Won-Bae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 813 days.

(21) Appl. No.: 12/187,138

(22) Filed: Aug. 6, 2008

(65) Prior Publication Data

US 2009/0040018 A1 Feb. 12, 2009

(30) Foreign Application Priority Data

Aug. 7, 2007 (KR) .............................. 2007-0078906

(51) Int. Cl.
*G05B 19/00* (2006.01)
*G06F 7/00* (2006.01)
*G05B 23/02* (2006.01)
*G05B 23/00* (2006.01)
*G09G 5/00* (2006.01)
*G06F 3/041* (2006.01)
*G06F 3/042* (2006.01)
*H04M 1/00* (2006.01)

(52) U.S. Cl.
USPC ........... 340/5.2; 340/5.73; 340/5.54; 340/3.1; 340/5.26; 345/168; 345/173; 345/175; 455/550.1; 455/575.1

(58) Field of Classification Search
USPC ............. 340/5.2, 5.7, 5.73, 825, 3.7, 5.6, 3.1, 340/5.26, 10.1, 825.25, 5.27, 5.33, 5.64, 340/12.5, 5.54; 345/156, 158, 168, 169, 345/173, 175; 235/492, 382, 382.5, 449, 235/487, 380; 455/550.1, 575.1
See application file for complete search history.

(56) References Cited

U.S. PATENT DOCUMENTS

| 5,465,083 | A | * | 11/1995 | Okamoto | 340/5.54 |
| 6,269,260 | B1 | * | 7/2001 | Shin et al. | 455/550.1 |
| 6,985,137 | B2 | * | 1/2006 | Kaikuranta | 345/175 |
| 2003/0231103 | A1 | * | 12/2003 | Fisher | 340/5.73 |
| 2004/0108938 | A1 | * | 6/2004 | Entrekin | 340/5.73 |
| 2005/0116840 | A1 | * | 6/2005 | Simelius | 341/22 |
| 2006/0012577 | A1 | * | 1/2006 | Kyrola | 345/173 |
| 2007/0117597 | A1 | * | 5/2007 | Karan | 455/575.1 |
| 2007/0129098 | A1 | * | 6/2007 | Cheng et al. | 455/550.1 |
| 2008/0055276 | A1 | * | 3/2008 | Chang | 345/175 |

FOREIGN PATENT DOCUMENTS

| KR | 10-2002-0059798 A | 7/2002 |
| KR | 10-2007-0017701 A | 2/2007 |

* cited by examiner

*Primary Examiner* — Jennifer Mehmood
*Assistant Examiner* — Mirza Alam
(74) *Attorney, Agent, or Firm* — Jefferson IP Law, LLP

(57) ABSTRACT

An apparatus and method for controlling a key lock in a portable terminal are provided. The apparatus includes a keypad, a key buffer, and an input controller. The keypad has a plurality of key buttons and detects at least one key input. The key buffer temporarily stores input key information. The input controller stores the at least one key input, which is detected by the keypad, in the key buffer in a key lock state and determines if a combination of key inputs stored in the key buffer includes an unlock key combination.

12 Claims, 3 Drawing Sheets

APPARATUS AND METHOD FOR CONTROLLING KEY LOCK IN PORTABLE TERMINAL

PRIORITY

This application claims the benefit under 35 U.S.C. §119(a) of a Korean patent application filed in the Korean Intellectual Property Office on Aug. 7, 2007 and assigned Serial No. 2007-78906, the entire disclosure of which is hereby incorporated by reference.

BACKGROUND OF THE INVENTION

1. Field of the Invention

The present invention relates to an apparatus and method for a portable terminal. More particularly, the present invention relates to an apparatus and method for controlling a key lock in a portable terminal.

2. Description of the Related Art

In general, portable terminals are provided with key input units including keypads disposed on the bodies of the portable terminals. Conventional folder type, slide type, or flip type mobile communication terminals selectively expose keypads by opening/closing to protect the keypads from the external environment.

In recent years, because of a trend toward lightweight mobile communication terminals, attention has been placed on bar type mobile communication terminals that include exposed keypads. Slide type mobile communication terminals include keypads in which a portion thereof is selectively exposed while the other portion is always exposed for key input execution.

As portable terminals increasingly perform a variety of functions, keys corresponding to frequently used functions, such as a camera function or a multimedia function, are installed as external keys on the outside of mobile communication terminals so that it is convenient for users to press the keys. These external keys are easy to operate by mistake because they are positioned such that they are outside an apparatus for protecting keys.

In portable terminals having a plurality of external keys or having keypads exposed in whole or in part, it frequently occurs that key buttons are pressed by mistake, thereby unintentionally enabling operation of the portable terminals. For example, while a portable terminal is carried by a user and placed in a bag or pocket, other articles in the bag or pocket may press a key button of the portable terminal by accident, thereby causing an undesired operation of the portable terminal. This undesired operation of the portable terminal then requires the user's attention and causes an unnecessary consumption of charged power and causes a problem in that a user incurs an unnecessary call and/or communication fee.

Conventional methods for controlling a key lock include a method of adding an assistance key (e.g., a hold key) for locking/unlocking a key input and a method of setting a lock/unlock by manipulating a User Interface (UI).

However, in the conventional method of adding the assistance key (e.g., the hold key), an additional cost is incurred and a design is limited because of the added assistance key.

The conventional key lock control method using the UI requires execution of several processes for a lock/unlock and is relatively time consuming and inconvenient. In addition, when a portable terminal that operates in an idle mode, that is, in a sleep mode that is key-locked, if the portable terminal detects a key input, the key lock control method using the UI enables the portable terminal in order to determine whether the key input is a series of key unlock processes. Therefore, undesired frequent key input may lead to frequent enabling of portable terminals, thereby consuming power.

SUMMARY OF THE INVENTION

An aspect of the present invention is to address at least the above-mentioned problems and/or disadvantages and to provide at least the advantages below. Accordingly, an aspect of the present invention is to provide an apparatus and method for controlling a key lock in a portable terminal.

Another aspect of the present invention is to provide an apparatus and method for controlling a key input lock/unlock by a preset lock key combination/unlock key combination in a portable terminal.

A further aspect of the present invention is to provide an apparatus and method for controlling a key lock in a portable terminal that has a separate input controller for determining if a preset unlock key combination is input.

Still another aspect of the present invention is to provide an apparatus and method for controlling a key lock in a portable terminal, for, when the portable terminal is in a key lock state, allowing an input controller to determine if it receives a preset unlock key combination and converting the key lock state into a key unlock state if a valid unlock key combination is received.

The above aspects are addressed by providing an apparatus and method for controlling key lock in a portable terminal.

According to one aspect of the present invention, an apparatus for controlling a key lock in a portable terminal is provided. The apparatus includes a keypad, a key buffer, and an input controller. The keypad has a plurality of key buttons and detects at least one key input. The key buffer temporarily stores input key information. The input controller stores the at least one key input, which is detected by the keypad, in the key buffer in a key lock state and determines if a combination of key inputs stored in the key buffer comprises an unlock key combination.

According to another aspect of the present invention, a method for controlling a key lock in an input controller of a portable terminal is provided. The method includes detecting at least one key input in a key lock state, storing the detected at last one key input, and determining, by an input controller, if a combination of stored key inputs comprise an unlock key combination.

According to a further aspect of the present invention, a method for controlling a key lock in a controller of a portable terminal is provided. The method includes detecting a first key input of a lock key combination in a key unlock state, determining if all keys of the lock key combination are input within a preset time, and, if all the keys of the lock key combination are input within the preset time, sending a request for conversion of the key unlock state into a key lock state to an input controller.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

Exemplary embodiments of the present invention relate to an apparatus and method for controlling a key lock in a portable terminal, for controlling a locking/unlocking of a key input of the portable terminal with a preset lock key combination/unlock key combination using a combination of existing keys without adding a lock key for controlling the key input of the portable terminal. A construction of an apparatus of an exemplary embodiment of the present invention is described below with reference to FIG. 1.

Figure 1:
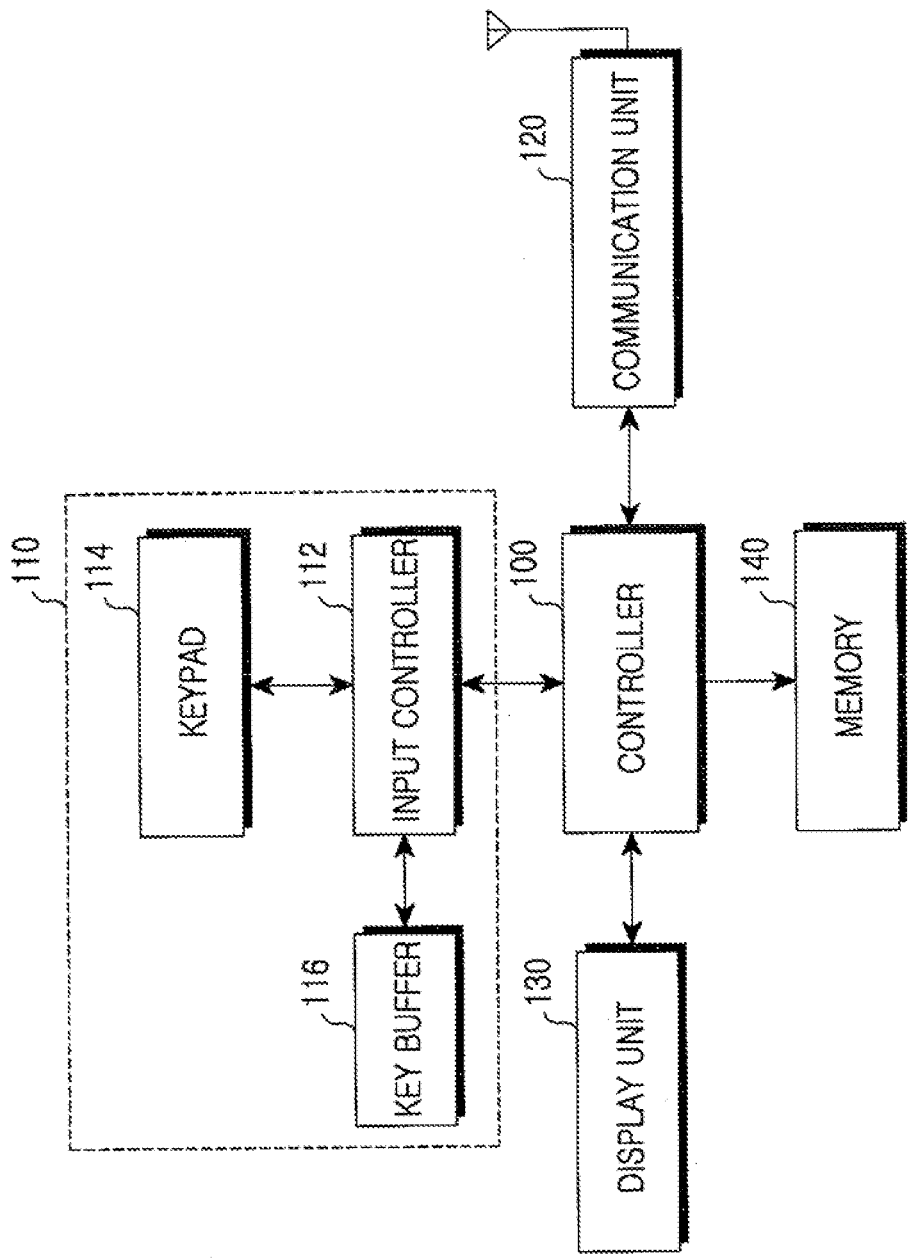
FIG. 1 is a block diagram illustrating a construction of a portable terminal for controlling a key lock according to an exemplary embodiment of the present invention.

FIG. 1 is a block diagram illustrating a construction of a portable terminal for controlling a key lock according to an exemplary embodiment of the present invention. Referring to FIG. 1, the portable terminal according to the present invention includes a controller 100, an input unit 110, a communication unit 120, a display unit 130, and a memory 140.

In a reception mode, the communication unit 120 processes a radio frequency signal received through an antenna by frequency down conversion, despreading, and channel decoding. In a transmission mode, the communication unit 120 processes data by channel coding, spreading, and frequency up conversion and transmits the processed data through the antenna.

The display unit 130 displays state information (or an indicator) generated during an operation of the portable terminal, a limited number of characters, moving pictures, still pictures, etc. The display unit 130 can be a color Liquid Crystal Display (LCD) and the like. In this case, the display unit 130 may include a controller for controlling the LCD, a video memory in which image data is stored and an LCD element. If the LCD is provided as a touch screen, the display unit 130 may perform a part or all of the functions of the input unit 110.

The memory 140 temporarily stores a program for controlling general operations of the portable terminal and data generated during the operations and stores storage data such as a phone number, a Short Message Service (SMS) message, video data, etc.

The input unit 110 includes an input controller 112, a keypad 114, and a key buffer 116. The keypad 114 includes a plurality of function keys such as numeral keys '0' to '9', a menu key, a cancel key (delete), an OK key, a talk key, an end key, an Internet key, navigation keys (direction keys), etc. The input unit 110 provides key input data corresponding to a key pressed by a user, to the input controller 112.

The key buffer 116 temporarily stores key input data received through the keypad 114 when the portable terminal is in a key lock state under the control of the input controller 112.

If receiving key input data from the keypad 114 in a key unlock state in which a key input is possible, the input controller 112 provides the received key input data to the controller 100. If a request for conversion into a key lock state is received from the controller 100, the input controller 112 converts into the key lock state.

If key input data is received from the keypad 114 in a key lock state in which a key input is locked according to a setting of the controller 100, the input controller 112 stores the received key input data in the key buffer 116 and determines if a key combination input within a preset time is an unlock key combination for a key unlock. If the input key combination is a lock key combination, the input controller 112 maintains the key lock state. If the input key combination is the unlock key combination, the input controller 112 converts the key lock state into a key unlock state. At this time, if the controller 100 is in an idle mode, the input controller 112 converts the idle mode of the controller 100 into a general mode and converts the key unlock state into the key lock state.

The idle mode of the controller 100 represents a disabled state with no supply of power to the controller 100, that is, with substantially no power consumption. In the idle mode, the use of each function of the portable terminal is minimized and power consumption of the portable terminal is minimized. For example, in the idle mode, the display unit 130 displays no picture and the communication unit 120 operates in a sleep mode and only switches to a communication state at regular intervals of time. On the other hand, the general mode represents a state with power supplied to the controller 100. In the general mode, each function of the portable terminal operates in a normal manner.

The controller 100 controls general operations of the portable terminal. For example, the controller 100 performs a process and controls for voice telephony and data communication. In addition to a general function, according to the exemplary embodiment of present invention, if key input data received in a key unlock state corresponds to a first key of a lock key combination for converting into a key lock state, the controller 100 determines if it receives key input data of a lock key combination within a preset time. If receiving the key input data of the lock key combination within a preset time, the controller 100 controls the input controller 112 to convert a key unlock state into a key lock state. If the key input data of the lock key combination is not received within a preset time, the controller 100 controls and performs an operation corresponding to an input key according to the conventional art.

As described above with reference to FIG. 1, in an exemplary embodiment of the present invention, the controller 100 detects a key input for conversion of a key unlock state into a key lock state, and the input controller 112 detects a key input for conversion of a key lock state into a key unlock state. A method for controlling a key lock and locking/unlocking a key input in a portable terminal according to an exemplary embodiment of the present invention is described below with reference to the accompanying drawings.

Figure 2:
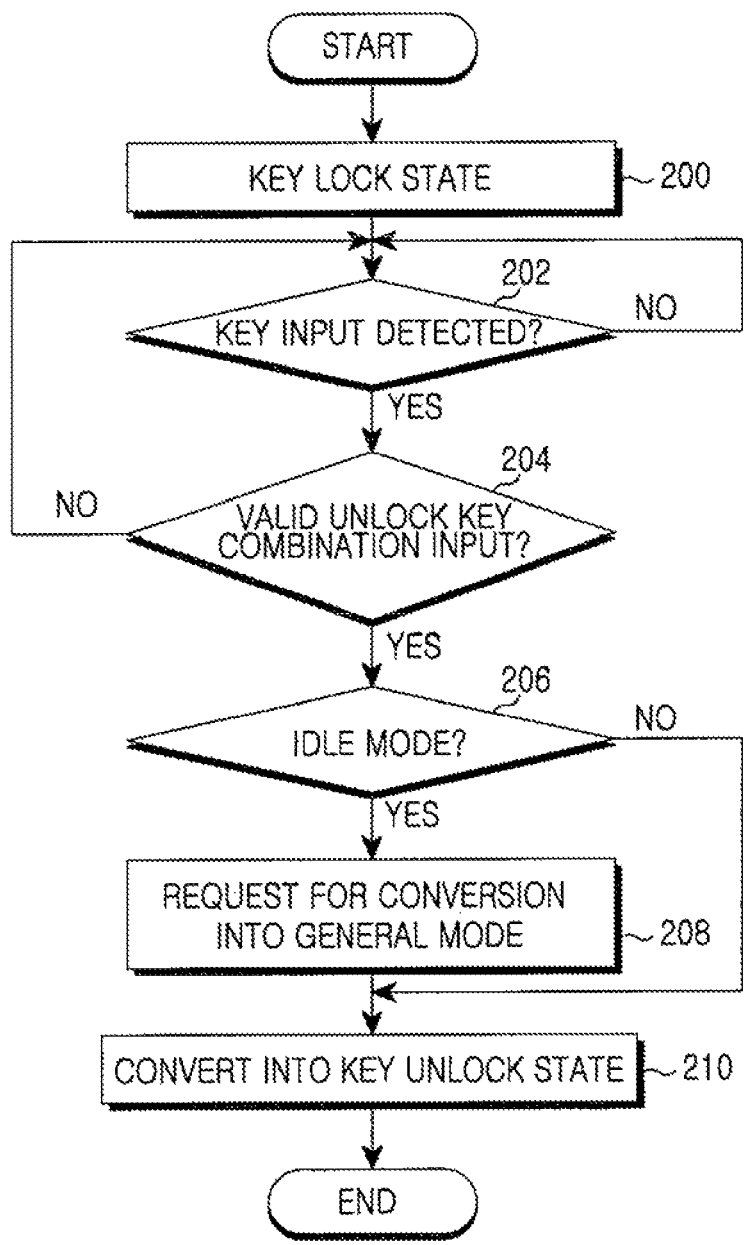
FIG. 2 is a flow diagram illustrating a process of a key unlock in a portable terminal according to an exemplary embodiment of the present invention.

FIG. 2 is a flow diagram illustrating a process of a key unlock in a portable terminal according to an exemplary embodiment of the present invention.

Referring to FIG. 2, in step 200, the input controller 112, for controlling a key input in a portable terminal according to an exemplary embodiment of the present invention, maintains a current key lock state in which a key input is locked according to a request of the controller 100. If at least one key input is detected in step 202, the input controller 112 determines if keys of a preset valid unlock key combination are input within a preset time in step 204. If the at least one key input is not detected in step 202, the input controller 112 repeatedly performs step 202. If the keys of the unlock key combination are not input in step 204, the input controller 112 maintains the key lock state and then, returns to step 202 to again detect at least one key input.

If the keys of the unlock key combination are input in step 204, the input controller 112 determines if the controller 100 is currently in an idle mode in step 206. If the controller 100 is in the idle mode in step 206, the input controller 112 sends a request for conversion into a general mode to the controller 100 in step 208 and converts into a key unlock state in step 210.

If the controller 100 is in the general mode instead of the idle mode in step 206, the input controller 112 converts into a key unlock state in step 210.

Figure 3:
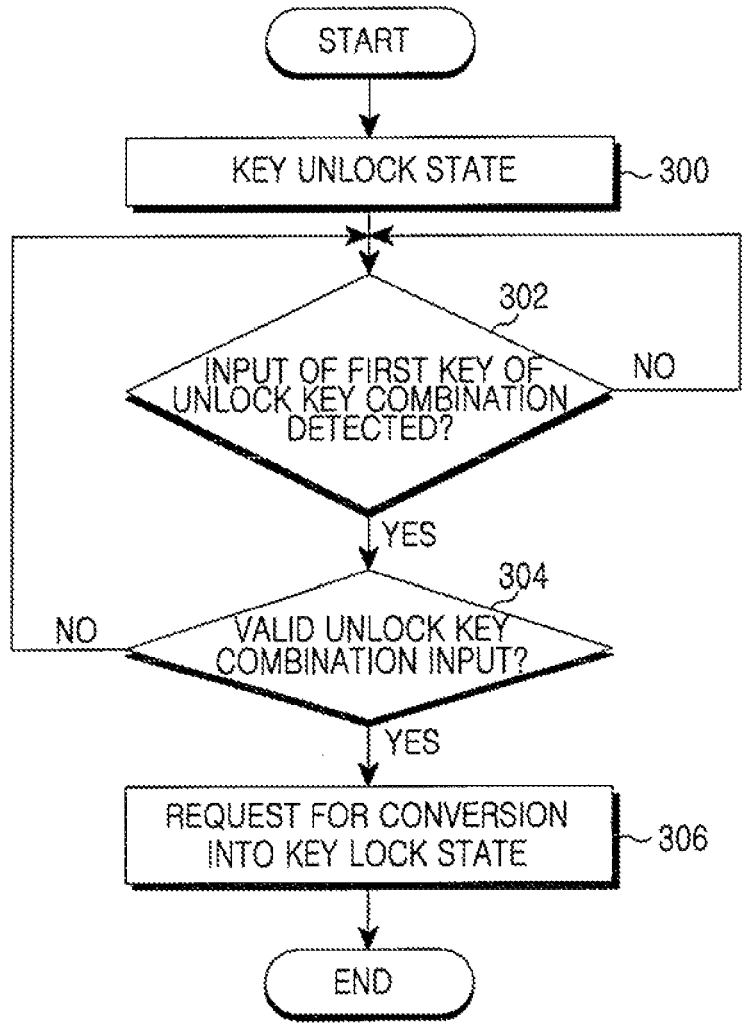
FIG. 3 is a flow diagram illustrating a process of a key lock for locking a key input in a portable terminal according to an exemplary embodiment of the present invention.

FIG. 3 is a flow diagram illustrating a process of a key lock for locking a key input in a portable terminal according to an exemplary embodiment of the present invention.

Referring to FIG. 3, the controller 100 of a portable terminal according to an exemplary embodiment of the present invention maintains a key unlock state in which a key input is unlocked in step 300 and determines if a first key of a preset lock key combination is input in step 302. If an input of the first key of the lock key combination is detected in step 302, the controller 100 determines if all keys of a valid lock key combination have been input within a preset time in step 304. If an input of the first key of the lock key combination is not detected in step 302, the controller 100 repeatedly performs step 302. If all the keys of the lock key combination have not been input within a preset time in step 304, the controller 100 returns to step 302.

If all the keys of the lock key combination have been input within a preset time in step 304, the controller 100 sends a request for conversion into the key lock state to the input controller 112 and controls the input controller 112 to convert the key unlock state into the key lock state in step 306.

As described above, exemplary embodiments of the present invention relate to an apparatus and method for controlling key lock in a portable terminal that includes a key pad having a plurality of key buttons and detecting a key input, a key buffer for temporarily storing input key information, and an input controller for storing the key input, which is detected by the key pad, in the key buffer in a key lock state and determining if a combination of a recent key input stored in the key buffer is an unlock key combination. Unlike the conventional art, exemplary embodiments of the present invention can perform a key lock control process without adding a separate key. In addition, the present invention has an effect of reducing power consumption through the key lock control process according to exemplary embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal for controlling a key lock, the terminal comprising:
   an input controller for converting the terminal from a key lock state to a key unlock state if one or more key inputs detected during a key lock state matches an unlock key combination; and
   a controller for, if at least one key input detected during the key unlock state is provided from the input controller to the controller, performing a function corresponding to the at least one key input,
   wherein the controller is in an inactive mode during the key lock state of the terminal, and
   wherein, when converting the terminal from the key lock state to the key unlock state, the input controller sends a request, for conversion from the inactive mode to an active mode of the controller, to the controller.

2. The terminal of claim 1, wherein the input controller converts the terminal from the key lock state to the key unlock state if the one or more key inputs that matches the unlock key combination is detected within a preset time.

3. The terminal of claim 1, wherein the input controller does not provide the one or more key inputs detected during the key lock state to the controller.

4. The terminal of claim 1, wherein the controller sends a request, for conversion of the terminal from the key unlock state to the key lock state, to the input controller, if the at least one key input matches a lock key combination that is detected within a preset time during the key unlock state, and the input controller converts the terminal from the unlock state to the key lock state, if the request for conversion from the key unlock state to the key lock state is received from the controller during the key unlock state.

5. A method for controlling a key lock of a portable terminal, the method comprising:
   converting, by an input controller, the terminal from a key lock state to a key unlock state if one or more key inputs detected during a key lock state matches an unlock key combination;
   after converting the terminal from the key lock state to the key unlock state, if a controller is in an inactive mode, sending, by the input controller, a request, for conversion from the inactive mode to an active mode of the controller, to the controller; and
   if at least one key input detected during the key unlock state is provided from the input controller to the controller, performing, by the controller, a function corresponding to the at least one key input.

6. The method of claim 5, wherein the converting, by the input controller, the terminal from the key lock state to the key unlock state if the one or more key inputs matches the unlock key combination is detected within a preset time.

7. The method of claim 6, wherein the input controller does not provide the one or more key inputs detected in the key lock state to the controller.

8. A method for controlling a key lock of a portable terminal, the method comprising:
   detecting at least one key input of a lock key combination during a key unlock state;
   determining if all keys of the lock key combination are detected within a preset time; and
   if all the keys of the lock key combination are detected within the preset time, sending, by a controller, a request for conversion from the key unlock state to a key lock state to an input controller,
   wherein the key unlock state is a state in which a function corresponding to the at least one key input detected during the key unlock state is performed by the controller,
   wherein the key lock state is a state in which a function corresponding to one or more key inputs detected during the key lock state is not performed by the controller, and wherein the input controller does not provide the one or more key inputs detected during the key lock state to the controller.

9. The method of claim 8, wherein the determining if all keys of the lock key combination are detected within a preset time is performed only if the at least one key of the lock key combination is detected.

10. The method of claim 8, further comprising, if all the keys of the lock key combination are not detected within the preset time, performing a function corresponding to at least one input key.

11. A portable terminal for controlling a key lock, the terminal comprising:
   an input controller for converting the terminal from a key lock state to a key unlock state if a combination of one or more key inputs detected during a key lock state comprises an unlock key combination,
   wherein a controller is in an inactive mode during the key lock state of the terminal, and
   wherein, when converting the terminal from the key lock state to the key unlock state, the input controller sends a request, for conversion from the inactive mode to an active mode of the controller, to the controller.

12. A method for controlling a key lock of a portable terminal, the method comprising:
   converting, by an input controller, the terminal from a key lock state to a key unlock state if a combination of one or more key inputs detected during a key lock state comprises an unlock key combination; and
   after converting the terminal from the key lock state to the key unlock state, if a controller is in an inactive mode, sending, by the input controller, a request, for conversion from the inactive mode to an active mode of the controller, to the controller.

* * * * *